INVENTOR
BRUNO O. WEINSCHEL

BY Max L. Libman
ATTORNEY

INVENTOR
BRUNO O. WEINSCHEL

BY Max L. Libman

ATTORNEY

INVENTOR
BRUNO O. WEINSCHEL

BY Max L. Libman

ATTORNEY 2,941,169

RAPIDLY CONVERGING WIDE-RANGE DOUBLE-STUB MICROWAVE IMPEDANCE MATCHING DEVICE

Bruno O. Weinschel, 6900 Marbury Drive, Bethesda, Md.

Filed Oct. 15, 1958, Ser. No. 767,408

10 Claims. (Cl. 333—33)

This invention relates to impedance matching and transforming devices for use in high frequency transmission systems, and more particularly relates to improvements in double-stub tuners especially adapted for use with coaxial lines as variable radio-frequency impedance transformers.

In transforming energy from one high frequency device to another, it is important that the impedances of the devices must be properly matched to achieve a maximum transfer of power and maintain a low standing wave ratio on the line. This is particularly important when making power or attenuation measurements, since the assumption is usually made that the incident power is being measured, and this is correct only if the power-measuring element absorbs all power incident to it.

The use of a pair of adjustable short-circuited stub transmission line sections in shunt with a coaxial line as an impedance matching device is known in the art, such a device being shown, for example, in U.S. Patent to Hansen, No. 2,438,912, granted April 6, 1948, and U.S. Patent to Woodward, No. 2,422,160, granted June 10, 1947.

It is a major object of the invention to provide an improved double-stub tuner which can be used over a wide range of impedances and frequencies, and which can be easily and rapidly adjusted to a matched condition.

Another object is to provide a double-stub tuner of simple and compact construction and of highly accurate design which is readily reproducible to precise settings, which can be firmly fixed in any adjusted position, and which will remain stable in electrical operation and mechanical adjustment.

Still another object is to provide a double-stub tuner having provision for readily changing the spacing between stubs to vary the impedance match, and providing also variable spacing distances and ratios which enable rapid convergence by successive alternate adjustments of the stub electrical lengths.

The specific nature of the invention as well as other objects and advantages thereof will clearly appear from a description of a preferred embodiment as shown in the accompanying drawings, in which.

A great deal of theoretical literature exists on the subject of matching stub arrays, but it is usually assumed that the characteristic impedance of the line, the load impedance, and the wavelength are known. When this information is accurately available, it is theoretically, and perhaps practically, possible to compare the stub lengths and spacings between stubs for proper match. In practice, however, the situation is usually very different from the theoretical situation. The true load impedance is seldom known or easily found. In a practical device, i.e., not too expensive or complicated in construction, the spacing between the stubs is fixed, particularly when working with coaxial lines, and the true stub length is seldom known nor of much practical value. Instead, the stubs are made adjustable as to length and are usually adjusted, one at a time, for minimum indivated VSWR as measured by the use of a slotted line looking into the tuner. The procedure is one of adjusting first one stub and then the other, of a double-stub tuner, each for a minimum standing wave ratio, in the hope that this procedure will rapidly converge to a matched condition, which sometimes occurs and sometimes not, depending largely on the ratio of stub spacing to wavelength. It is also important that the correct setting, when found, should be readily reproducible without extensive readjustment of the tuner.

Figures 1, 2:
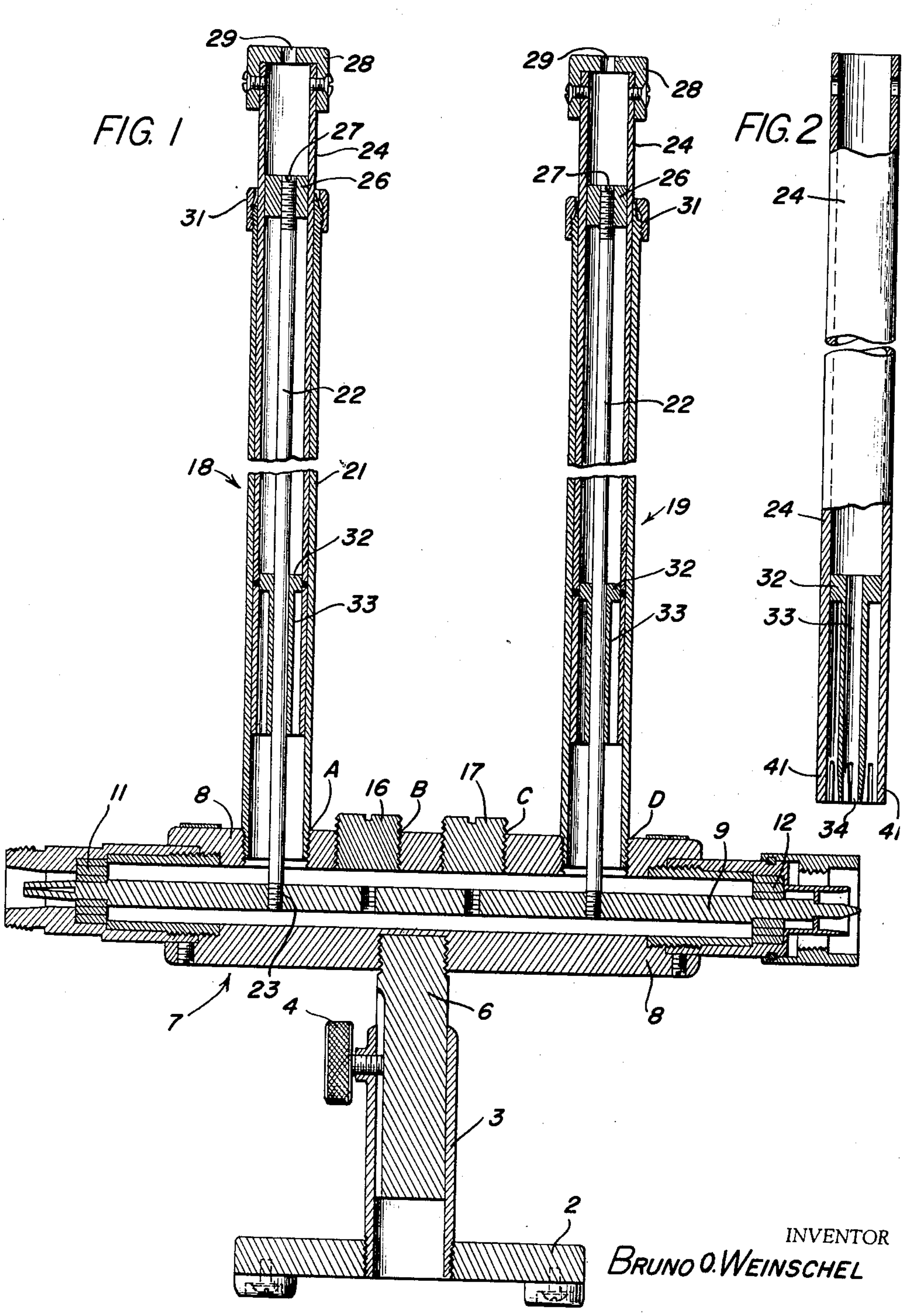
Fig. 1 is a longitudinal sectional view in elevation of a double-stub tuner according to the invention, taken on line 1—1 of Fig. 4.
Fig. 2 is an enlarged view, partly in section, of the contact tube assembly of Fig. 1.

Referring to Fig. 1, a tuner according to the invention is shown mounted on a base 2 to which is fixed a vertical pipe section 3 having a threaded aperture for a clamping nut 4 for adjustably clamping a stem 6 slidably mounted on pipe 3. Stem 6 is fixed to a coaxial line section 7 comprising outer and inner coaxial conductors 8 and 9 spaced and insulated from each other by annular insulating members 11 and 12, and provided at the respective ends with suitable male and female coaxial connector fittings 13 and 14 respectively, for attachment in a coaxial line circuit.

Typically, the attached coaxial cable circuit would comprise a generator or source of high frequency feeding a coaxial cable connected to a slotted line section and VSWR indicator, on one side of the tuner section shown in Fig. 1, and a load on the other side of the tuner, as will be shown below.

The outer conductor 8 of the coaxial line section is drilled and tapped at several locations (shown as four locations, A, B, C, D) for reception of the outer coaxial conductor of a coaxial section. The inner conductor 9 is also tapped at the center of the same location for reception of the center coaxial conductor of such coaxial stub sections. At any given time, two of these locations are not used, and the tapped holes at these locations are therefore filled up with two plugs 16 and 17 respectively, which are designed when inserted to retain the smooth continuity of the inner surface of conductor 8 as much as possible. Stub sections 18 and 19 are inserted into the apertures at the remaining two locations. Since these units are identical, it will be necessary to describe only one of them in detail.

Stub 18 comprises an outer coaxial conductor 21 which is threaded at its lower end to engage any one of the tapped apertures at the four locations mentioned above. The central conductor 22 of the stub is similarly threaded as shown at 23 to engage the central conductor of the coaxial line section 7. An inner tube 24 is slidingly fitted in tube 21 and dimensioned to make a good sliding fit therewith. The inner conductor 22 of the stub is provided at its upper end with a round nut 26 rigidly fastened thereto, and of an outer diameter to slidably fit in the interior of tube 24. The top surface of nut 26 is provided with a slot 27 for screwing the rod into firm threaded engagement with central conductor 9 of the coaxial section. Tube 24 is provided with a cap suitably fastened thereto, and having a central aperture 29 through which a screwdriver shaft may be passed to engage slot 27 so that rod 22 may be tightly secured to central conductor 9.

Fixed in conductive relation to tube 24 is an annular member 32 having attached thereto a smaller tubular member 33 of an internal diameter to slidingly engage central conductor 22 of the stub. The bottom end of tube 33 is slotted to form a number of fingers as shown at 34 in Fig. 2 in order to insure good conductive contact with the central conductor 22. A clamping nut 31 threaded on tube 21 at 20, and cooperating with the split and tapered end of tube 21 is provided to serve as a tube lock for locking tube 24 in any desired extended position with respect to the fixed inner and outer conductors of the stub. It will be apparent that when tube lock 31 is loosened, tube 24 can be slid up and down with respect to conductors 18 and 22 to change the electrical length of the stub as determined by position of short circuiting element 32, and tubular engaging member 33.

It should be noted that the bottom end of tube 24 may also be slotted as shown in Fig. 2, and the resulting fingers 41 may be pressed outwardly to insure a good spring-pressed contact between tube 24 and tube 21.

Figure 3:
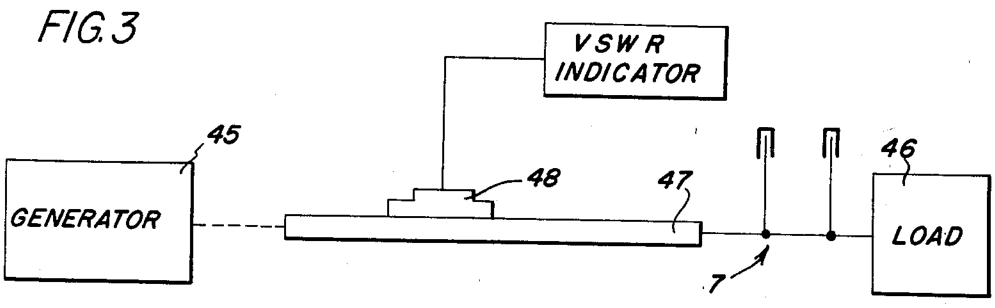
Fig. 3 is a schematic diagram showing a typical circuit arrangement in which the tuner may be used.

Fig. 3 shows schematically a typical circuit in which the double-stub tuner is used. A high-frequency generator 45 feeds a load 46 through a slotted line 47 (which may be of conventional design) having a probe 48 connected to a VSWR indicator. The double-stub tuner section 7 is inserted between the slotted line and the load 46, and is adjusted for minimum VSWR indication.

It is an important feature of the invention that the four locations A, B, C and D at which the coaxial stubs may be connected to the coaxial line section 7, are not equally spaced. The distance A–B is different from the distance B–C, and both are different from C–D. If uniform spacings were employed, then changing the position of the stubs would give only multiples of these uniform spacings. By employing non-uniform spacings, it is possible to obtain a large range of spacings, which enables the tuner to be set at favorable spacings which permit rapid convergence during the matching process.

Figure 4:
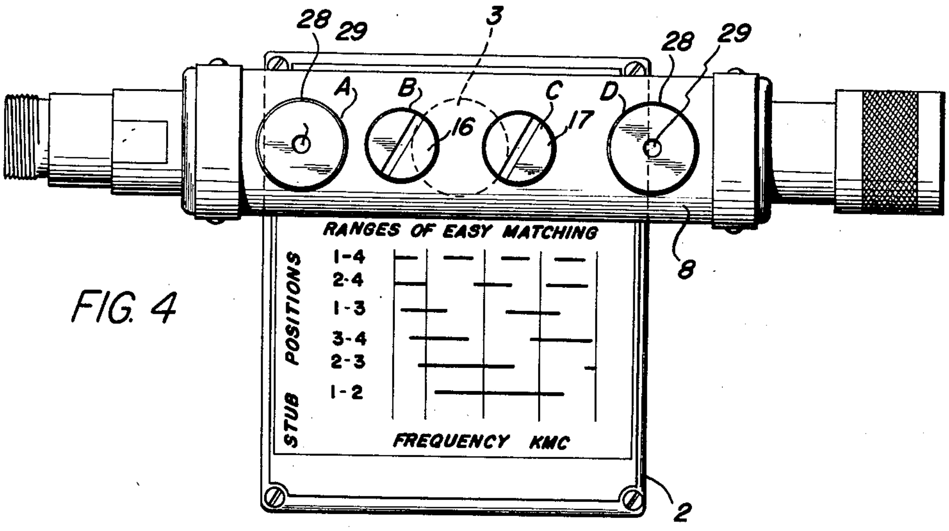
Fig. 4 is a plan view of the tuner of Fig. 1, showing a typical base plate chart.

Fig. 4 shows a reproduction of a typical baseplate chart used on base 2 in a commercial embodiment of the invention. The chart shows how with the spacings employed, not only can matching be accomplished over a very wide range of frequencies, but the entire range of frequencies can be covered by variations of the stub positions shown.

The spacing of the stub locations is also very important. If a spacing of ¼ wavelength is used, any load with a normalized conductance equal to or less than 1 can be matched, and on the surface it would appear that this would be an advantageous spacing to use. However, an analysis of this condition on a Smith chart will show that the convergence toward a matched condition through alternate adjustment of the stubs is very slow. If a spacing very slightly less than ½ wavelength is chosen, then theoretically at least, any impedance can be matched. However, the convergence is again very slow, and furthermore, the stub length becomes very critical. It is an important feature of the invention that the tuner spacing is so designed as to fall between 1/16 and 3/16 wavelength or 5/16 and 7/16, etc., for any wavelength over a large range.

If a spacing between stubs of ⅛ wavelength is employed, the condition of rapid convergence by alternate adjustments of the stubs is fulfilled and the stub lengths usually required do not fall close to multiples of ¼ wavelength; the adjustment is usually therefore not critical under these conditions.

In explaining the operation of the tuner, the following symbols will be used:

$$Z=R+jX$$

where:

$Z$=impedance
$R$=resistance
$X$=reactance $$Y=G+jB$$

where:

$Y$=admittance
$G$=conductance
$B$=susceptance

The double-stub tuner is used as a lossless matching element, that is, a coaxial lossless transformer. The input impedance of a short circuited lossless line is $$Z=j\cdot Z_0\cdot tg\beta l \qquad (1)$$

where:

$l$=length of the line
$Z_0$=characteristic impedance of the line
$\beta$=phase constant=$2\pi/\lambda$ If $l$, the length of the line, is variable through more than $\lambda/2$, it is possible to obtain as an input impedance all reactance values X from $-\infty$ to $+\infty$. This means that the stubs introduce shunt susceptances B of either positive or negative signs at certain points of the line.

Figure 5:
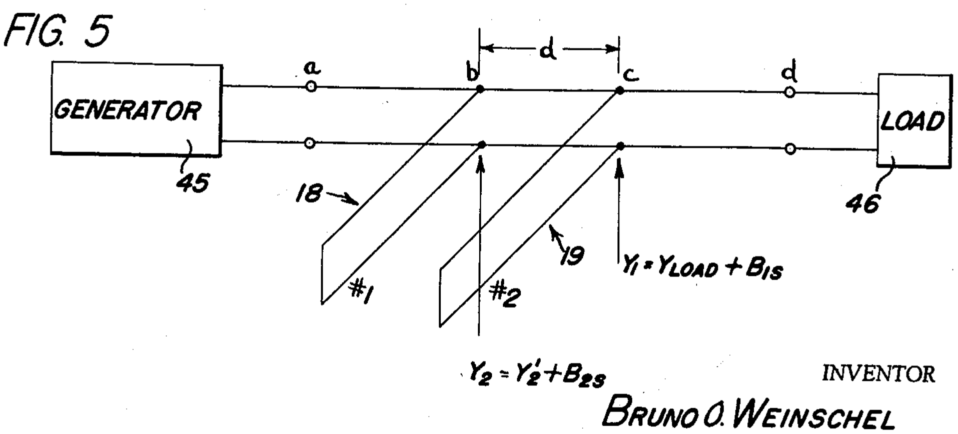
Fig. 5 is a highly schematic circuit diagram used in explaining the theory of operation of the double-stub tuner.

Referring to Fig. 5, in order to generalize the problem, stub No. 18 of Fig. 1 will be referred to as No. 1, and stub No. 19 will be referred to as stub No. 2. The reference plane between the tuner and generator 45 will be referred to as the tuner input, and the connection between the load and tuner will be referred to as the tuner output. The equivalent circuit is as shown in Fig. 5, where:

$B_{1s}$=input susceptance of stub No. 1
$B_{2s}$=input susceptance of stub No. 2
$Y_{load}$=admittance of load The line between the two stubs transforms the admittance at stub No. 1: $Y_1=Y_{load}+B_{1s}$ to an admittance at stub No. 2: $Y_2'$.
The admittance transformation is given by the following equation:

$$Y_2'=Y_0\frac{Y_1+j\cdot Y_0\cdot tg\beta d}{Y_0+j\cdot Y_1\cdot tg\beta d} \qquad (2)$$

where:

$Y_0$=characteristic admittance of the line between the two stubs
$d$=distance between the two stubs
$Y_2'$=admittance at stub No. 2, not including the shunt susceptance of stub No. 2

The admittance at the tuner input is then the sum of $Y_2'$ and the shunt susceptance of stub No. 2, $B_{2s}$:

$$Y_2=Y_2'+B_{2s} \qquad (3)$$

Referring now to the circuit of Fig. 3, which shows the use of the double-stub tuner in matching the impedance of load 46 to the line impedance in order to avoid or minimize reflections, a slotted section 47 is used which has the same characteristic impedance as the coaxial line employed, which may be, typically, 50 ohms. The two stubs are then alternately adjusted to minimize the VSWR indication until a match is obtained.

The procedure of stub adjusting will be discussed for three cases:

$$(a)\ d=\frac{\lambda}{8};\qquad (b)\ d=\frac{\lambda}{4};\qquad (c)\ d=\frac{17\lambda}{36}$$

Figure 6:
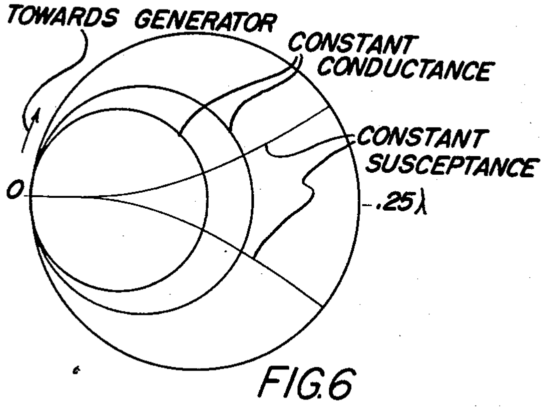
Fig. 6 is an admittance diagram similar to a Smith impedance chart rotated through 90°.

This procedure can be visualized by using an admittance diagram, which is similar to a Smith impedance chart with the coordinator given a half turn, as shown in Fig. 6.

(a) It is known that a short circuit stub adds a pure shunt susceptance which can be changed from $-\infty$ to $+\infty$, if the stub length can be changed by more than half a wavelength. It is desired to obtain at the input of the double-stub tuner an admittance, $Y=Y_0+j\cdot O$ in normalized coordinates: $y=l+j\cdot O$. This signifies that the normalized conductance $g$ should be equal to 1; the susceptance should be equal to 0. Therefore, we need at stub No. 2 (point $b$ in Fig. 5) a normalized admittance, $y=l+j\cdot b$, where $b$ can vary between $-\infty$ and $+\infty$. It is now possible to adjust this value by adjusting stub No. 2 toward 0, by adding a shunt susceptance $-b$. The adjustment of $g=1$ is made by stub No. 1. It is now necessary to find out at which point in the admittance diagram the admittance must lie (at point $c$ of Fig. 5) so that the transformation by a line length $d$ produces an admittance at point $b$ of Fig. 5, $y=l+j\cdot b$.

Figure 7:
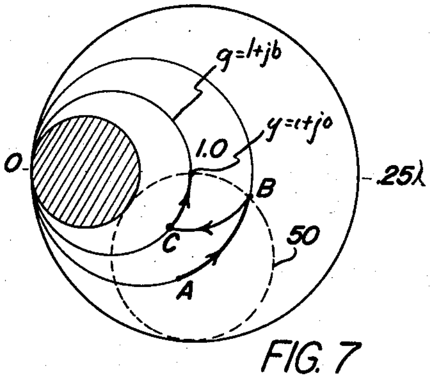
Figs. 7–11 are admittance charts similar to Fig. 6 for different assumed conditions of operation.

A line length $$d=\frac{\lambda}{8}$$

means a phase change of 90°. That means that the locus for our admittance at point $c$ is as shown by the dashed circle 50 in Fig. 7; this is identified as point C. For example, assuming the admittance of our load at point $c$ of Fig. 5 is $Y_{load}$ (point A in Fig. 7), we now adjust stub No. 1, which corresponds to moving along the heavy arc in Fig. 7, from point A to point B, along the locus of constant conductance. This new admittance appears at point $b$ of Fig. 3 as $Y_2$, reached by travelling along the heavy arc from point B to point C of Fig. 7. This is the same as turning the dashed circle 90°, which means that point C ends up on the circle $y=l+j\cdot b$. By adjusting stub No. 2, we travel along this last circle as shown by the heavy line, to $y=l+j\cdot O$, which corresponds to a perfect match.

($b$) We shall discuss the same procedure for $$d=\frac{\lambda}{4}$$

Figure 8:
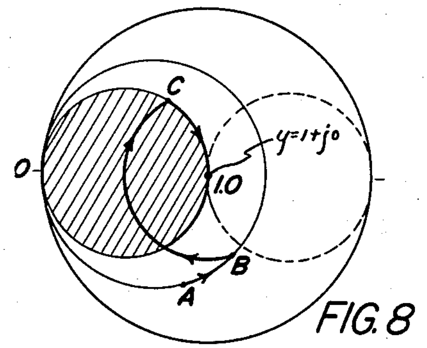

In this case the locus for our admittance at point C of Fig. 5 is the dashed circle in Fig. 8 (180° rotated). Therefore we move by adjusting stub No. 1 on a circle of constant conductance to point B in Fig. 8, which gives us $Y_1$. By transforming this admittance $\lambda/4$, we arrive at point C (180° rotated), or in other words, on the circle $y=l+j\cdot b$.

By adjusting the stub No. 2, we can again obtain $y=l+j\cdot O$, corresponding to perfect match.

($c$) For the last example, we use a distance $$d=\frac{17\lambda}{36}$$

very close to $\lambda/2$. Here the locus for our admittance at point $c$ of Fig. 5 is the dashed circle in Fig. 7 (340° rotated). We move therefore by adjusting stub No. 1 on a circle of constant conductance to point B in Fig. 9, which gives us the value of $Y_1$. By transforming the admittance over a distance $$d=\frac{17\lambda}{36}$$

we arrive at point C (340° turn of dashed line circle), or in other words, on $y=l+j\cdot b$. By adjusting the stub No. 2, we can again obtain $y=l+j\cdot O$, or perfect match.

The requirement to obtain perfect matching, is that the circle of constant conductance on which our load admittance $Y_{load}$ lies, crosses the desired circle. Therefore we can immediately draw the range of admittances, which cannot be matched with the particular stub spacing $d$, by drawing the circle of constant conductance, which touches our desired circle. These are the shaded areas in Figs. 7, 8, and 9. The connection between $d$ and matchable load conductance is a simple law:

$$g\leq l+c\cdot lg^2\cdot\frac{2}{\lambda}\cdot d \qquad (4)$$

This means that the conductance of the load must be smaller than the value indicated in the preceding equation, for example:

($a$) $d=\frac{1}{8}\lambda : g\leq 2$
($b$) $d=\frac{1}{4}\lambda : g\leq 1$
($c$) $d=\frac{1}{2}\lambda : g\leq \infty$ If we do not know, and in most cases we do not know, the impedance of our load, it is necessary to determine how to find the points B, C, and the matching point, or how to proceed to obtain the matching point. The only measurement possibility is the VSWR indication in front of the double-stub tuner. It can now be seen that the only range in which we can easily adjust reaches from $\frac{1}{16}\lambda\leq d\leq\frac{3}{16}$, and $\frac{5}{16}\lambda\leq d\leq\frac{7}{16}\lambda$, etc.

Figure 9:
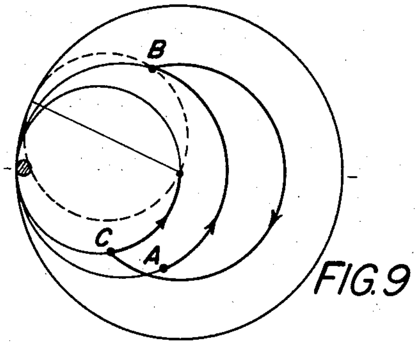
Figure 10:
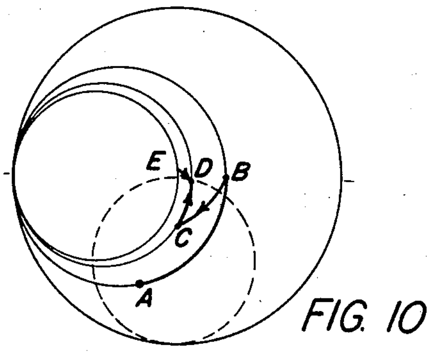
Figure 11:
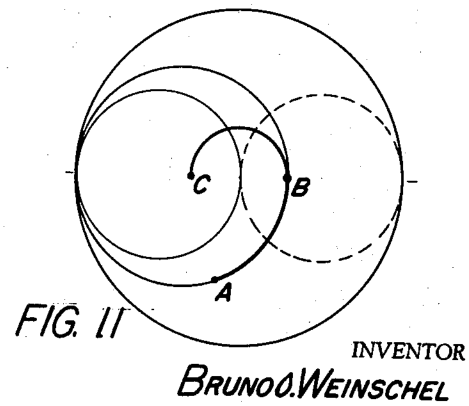

Considering, for example, one of the cases which we discussed, namely $$d=\frac{\lambda}{4}$$

reference is made to Fig. 9. By adjusting to minimum VSWR, we end up at point B of Fig. 11. The transformation to stub No. 2 brings this point to C with no improvement. That means, that in this case the procedure does not converge and the adjustment becomes pure guess work. A similar analysis for the case where $$d=\frac{\lambda}{8}$$

will, on the contrary, show rapid convergence. However, with $$d=\frac{\lambda}{2}$$

again, the procedure does not converge, and there is also an additional disadvantage. It can be seen that by comparing Figs. 5, 6, and 7, that the additional susceptance always becomes larger as $d$ becomes closer to $\lambda/2$. This means that we must work always around a stub-length of $\lambda/4$, at which the adjustment of a certain susceptance is very critical with the position of the short circuiting plunger.

It is clear from the foregoing that in order to obtain rapid convergence, a number of spacings should be made available which will give different distances $d$, within the range of rapid convergence for the particular frequency being considered. According to the invention, this is provided by making the distances between the possible stub positions A–E of Fig. 1 such that for any given frequency, a stub spacing can be selected which will lead to rapid convergence. Then, by using the correct spacing for any particular frequency, or rather, a correct stub spacing, since in some cases more than one stub spacing will give rapid convergence, it is always possible to obtain a rapid, easy and accurate matching by the simple expedient of alternately adjusting the lengths of stubs. In order to facilitate this, a chart is provided with each tuner, preferably fastened to the upper surface of base plate 2, which shows the user the ranges of easy matching for the various stub positions.

An example of such a chart is shown in Fig. 4, and is self-explanatory. It will be appreciated that if uniform spacing only were made available, then the choice of ranges becomes much more restricted and it becomes much more difficult to insure that a given tuner may be used over a wide frequency range.

In order to move a tuner from one position to another, it is only necessary to insert a screw driver through the aperture 29 in cap 28, and unscrew the central conductor 22 of the stub from the central conductor 9 of the coaxial line connection. After this is done, the outer tube can be readily unscrewed and the entire assembly is now free to be be inserted at any other location by reversing the procedure. The selection of such location is readily made by consulting the chart mounted on the base.

It is thus seen that the objects of the invention are achieved by the relatively simple means disclosed, which provide a rugged, reproducible double-stub tuner useful over a wide frequency range to produce a rapid and accurate convergence toward an adjusted condition.

It will be apparent that the embodiments shown are only exemplary and that various modifications can be made in construction and arrangement within the scope of my invention as defined in the appended claims.

I claim:

1. A high-frequency impedance transformer for use with a coaxial line, comprising a coaxial line section, a plurality of fixed attachment points, more than two in number, spaced along said line section, two coaxial stub tuner impedance sections, means for attaching one end of each of said impedance sections at any selected two of said attachment points, each of said tuner sections having adjustable shorting plunger means at its other end for adjusting its impedance by adjusting its effective length, successive spacings between said attachment points along said line section being substantially different from each other, for use over a wide range of frequencies.

2. The invention according to claim 1, the spacing between the first and second attachment points being different from the spacing between the second and third attachment points.

3. The invention according to claim 1, there being four such attachment points, the spacing between the first and second being different from the spacing between the second and third and between the third and fourth, and the last two spacings also being different from each other.

4. The invention according to claim 3, and a supporting base member, means supporting said coaxial line section on said base member, and a chart on said base member correlating the various possible stub tuner attachment positions with usable frequency ranges corresponding to the different attachment positions of the two stub tuner sections.

5. In combination, a source of microwave oscillations, a load circuit, wave guide means connected between said source and load for propagating microwaves therethrough and an adjustable impedance matching transformer comprising a part of said wave guide means adjacent said load, said transformer comprising a coaxial line section in said wave guide means, two coaxial stub tuner impedance sections, a plurality of cooperating means at fixed spaced attachment points more than two in number on said line section for attachment of said stub tuner sections, said attachment points being separated from each other by successively different distances along said line section, and means for attaching said stub tuner sections at any selected two of said attachment points.

6. The invention according to claim 5, there being four such attachment points.

7. The invention according to claim 5, and a VSWR indicator in said wave guide means between said transformer and said generator.

8. The invention according to claim 5, said coaxial line section comprising inner and outer coaxial conductors, coaxial line connectors at the ends of said line section for connection with said wave guide means, said stub tuner sections comprising inner and outer coaxial conductor means both threaded at the attachment end, each said attachment point on said line section comprising a threaded aperture in the outer conductor for receiving the outer conductor of an attached stub tuner and a smaller threaded aperture in the inner conductor centrally aligned with the first threaded aperture for receiving the inner conductor of said attached stub tuner.

9. The invention according to claim 8, and conductive screw plug means filling the apertures at the unused attachment points.

10. The invention according to claim 9, each of said stub tuner sections comprising a telescopically sliding tubular section slidably mounted on the outer coaxial conductor of the stub section, a cap covering the free end of said tubular section, said cap having an aperture for insertion of a tool for screwing and unscrewing the inner coaxial conductor of said stub tuner from engagement with the central conductor of said line section.

References Cited in the file of this patent

UNITED STATES PATENTS

| | | |
|---|---|---|
| 2,373,233 | Dow et al. | Apr. 10, 1945 |
| 2,598,671 | Boothby | June 3, 1952 |
| 2,757,344 | Kostriza et al. | July 31, 1956 |